US012479156B2

(12) United States Patent
Peterson et al.

(10) Patent No.: US 12,479,156 B2
(45) Date of Patent: Nov. 25, 2025

(54) ELECTRICAL WIRING HARNESS ASSEMBLY AND PROCESS FOR MANUFACTURING SAME

(71) Applicant: Aptiv Technologies AG, Schaffhausen (CH)

(72) Inventors: David R. Peterson, Aurora, OH (US); Joseph Sudik, Jr., Niles, OH (US); Jonathan D. Weidner, Conneautville, PA (US); Sean P. Krompegel, Canfield, OH (US); Jared Bilas, North Bloomfield, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 498 days.

(21) Appl. No.: 17/825,305

(22) Filed: May 26, 2022

(65) Prior Publication Data
US 2022/0288843 A1    Sep. 15, 2022

Related U.S. Application Data

(63) Continuation of application No. 16/203,703, filed on Nov. 29, 2018, now Pat. No. 11,345,084.

(Continued)

(51) Int. Cl.
*B29C 64/393* (2017.01)
*B29C 64/118* (2017.01)
(Continued)

(52) U.S. Cl.
CPC .......... *B29C 64/165* (2017.08); *B29C 64/118* (2017.08); *B29C 64/393* (2017.08); *B33Y 10/00* (2014.12); *B33Y 50/02* (2014.12); *B33Y 80/00* (2014.12); *H01B 7/0045* (2013.01); *H01B 13/0003* (2013.01); *H01B 13/01209* (2013.01);
(Continued)

(58) Field of Classification Search
CPC ... B29C 64/118; B29C 64/165; B29C 64/393; B29C 70/72; B29K 2995/0006; B29L 2031/3462; B33Y 10/00; B33Y 50/02; B33Y 80/00; H01B 13/0003; H01B 13/01209; H01B 13/01236; H01B 13/01263; H01B 13/24; H01B 7/0045
See application file for complete search history.

(56) References Cited

U.S. PATENT DOCUMENTS

2006/0147270 A1    7/2006  Parker
2011/0236614 A1*   9/2011  Ushikai ................ H02G 3/0481
                                              428/36.1

(Continued)

*Primary Examiner* — Yuhui R Pan
(74) *Attorney, Agent, or Firm* — Billion & Armitage

(57) ABSTRACT

A wiring harness assembly includes a plurality of electrical conductors having wires enclosed within insulative sheaths that are integrally formed of an electrically insulative material. The assembly also includes a lattice support structure that is attached to the insulative sheaths at multiple locations. The lattice support structure is configured to maintain a desired shape of the assembly. The lattice support structure is formed of filaments that may be formed using an additive manufacturing process The filaments may be arranged such that lattice support structure defines a plurality of hexagonally shaped apertures. A process for manufacturing the wiring harness assembly and an apparatus configured to manufacture the wiring harness assembly is also presented.

19 Claims, 15 Drawing Sheets

Related U.S. Application Data

(60) Provisional application No. 62/671,607, filed on May 15, 2018.

(51) Int. Cl.
| | |
|---|---|
| *B29C 64/165* | (2017.01) |
| *B33Y 10/00* | (2015.01) |
| *B33Y 50/02* | (2015.01) |
| *B33Y 80/00* | (2015.01) |
| *H01B 7/00* | (2006.01) |
| *H01B 13/00* | (2006.01) |
| *H01B 13/012* | (2006.01) |
| *H01B 13/24* | (2006.01) |
| *B29L 31/34* | (2006.01) |

(52) U.S. Cl.
CPC . *H01B 13/01236* (2013.01); *H01B 13/01263* (2013.01); *H01B 13/24* (2013.01); *B29K 2995/0006* (2013.01); *B29L 2031/3462* (2013.01)

(56) References Cited

U.S. PATENT DOCUMENTS

| | | | | |
|---|---|---|---|---|
| 2012/0105903 A1* | 5/2012 | Pettis | ................ | B33Y 50/00 |
| | | | | 358/1.14 |
| 2018/0268967 A1* | 9/2018 | Williamson | ........... | H01B 3/443 |
| 2019/0164662 A1* | 5/2019 | Alfson | ................ | H01B 7/17 |

\* cited by examiner

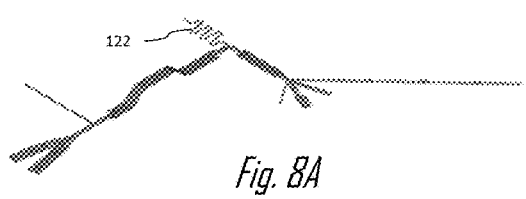
Fig. 8A
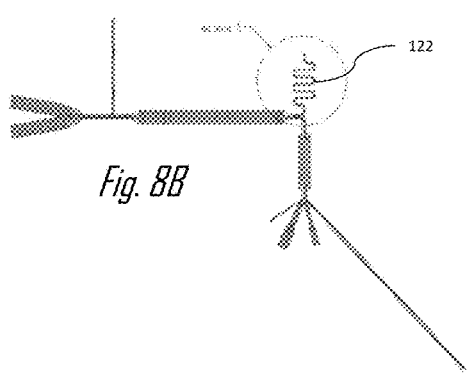
Fig. 8B
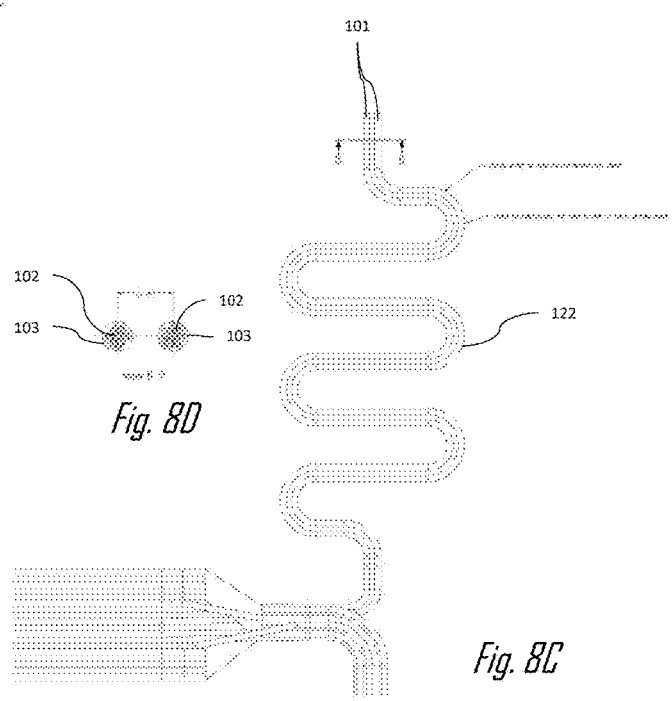
Fig. 8D
Fig. 8C

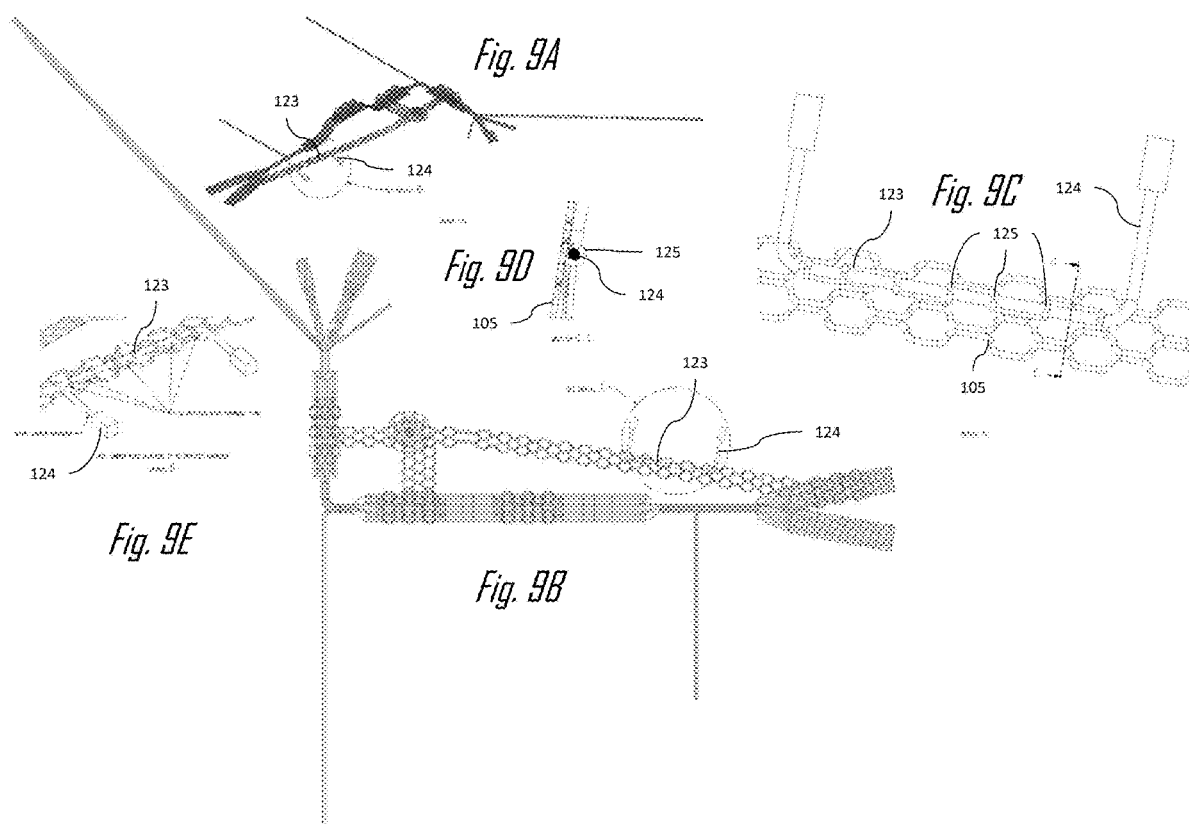

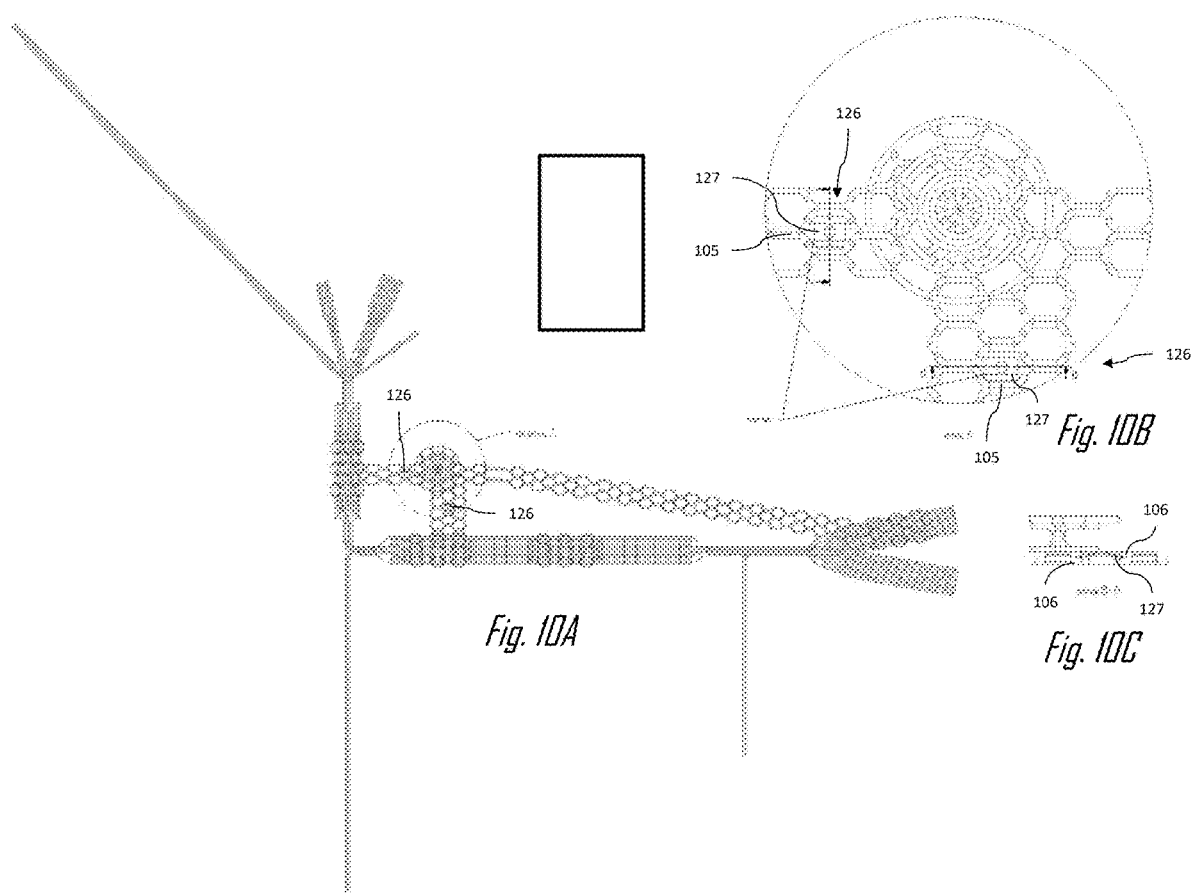

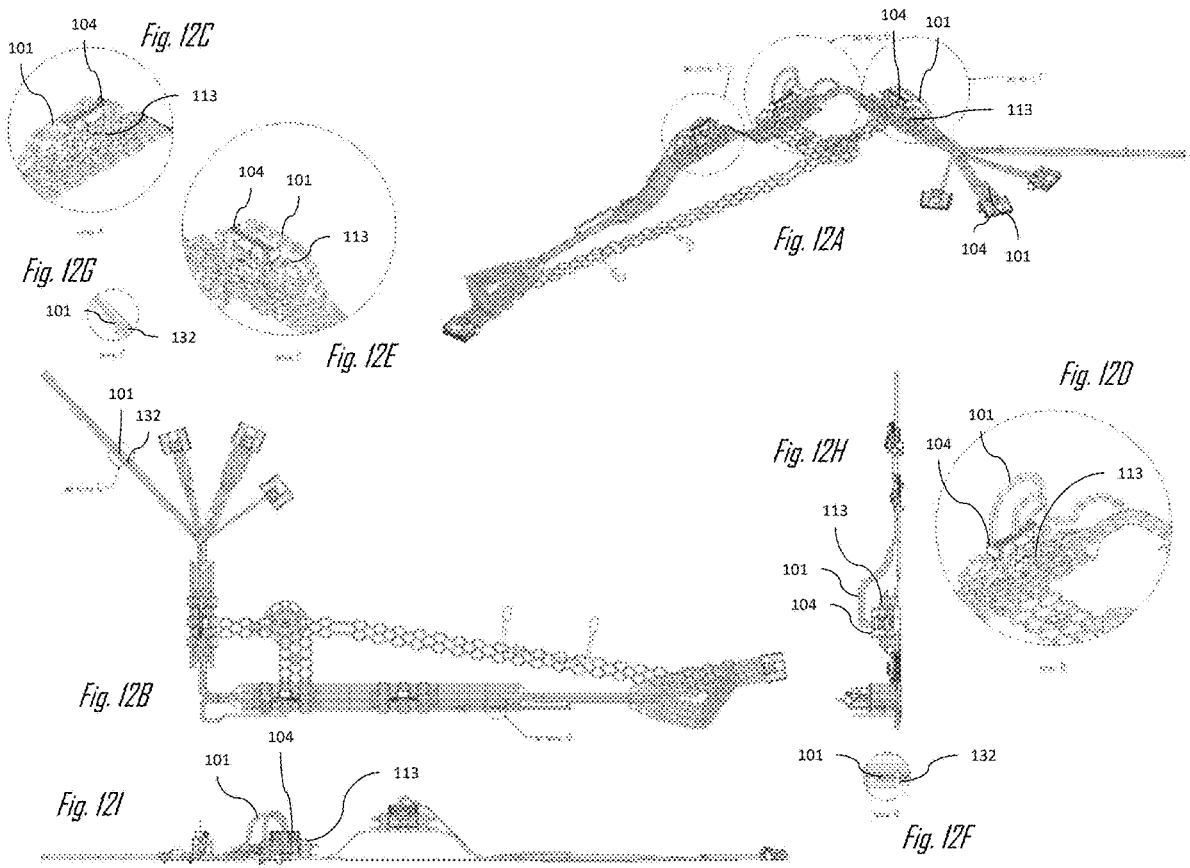

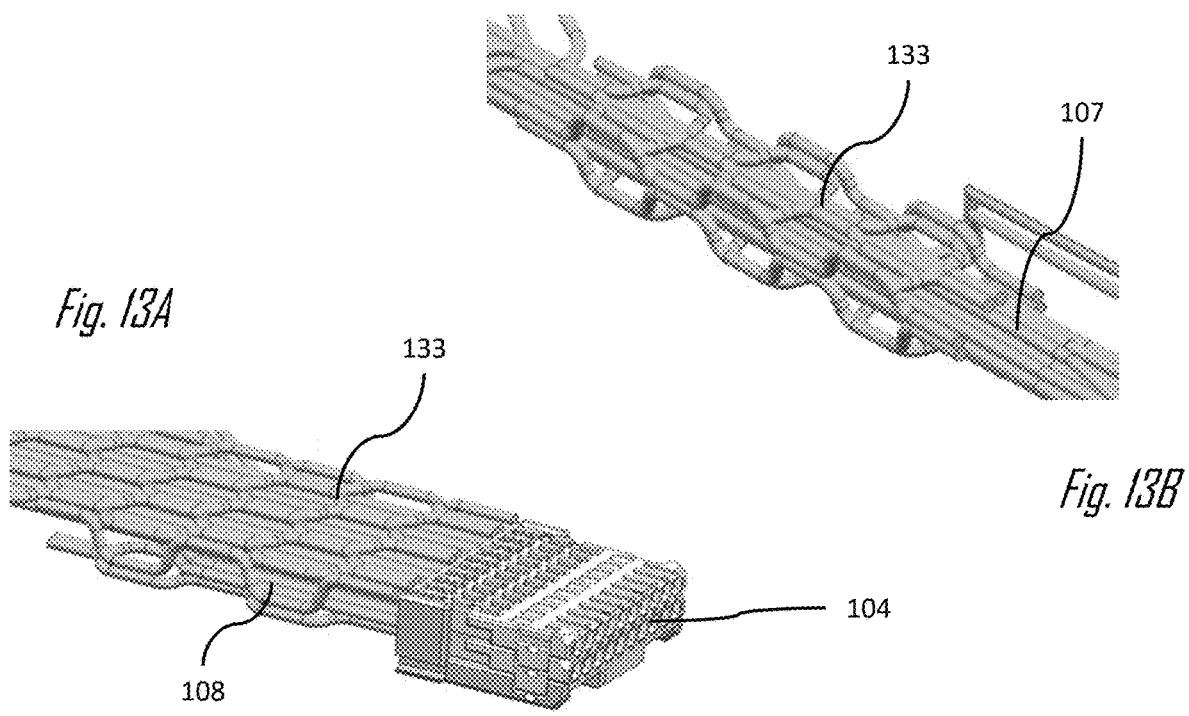

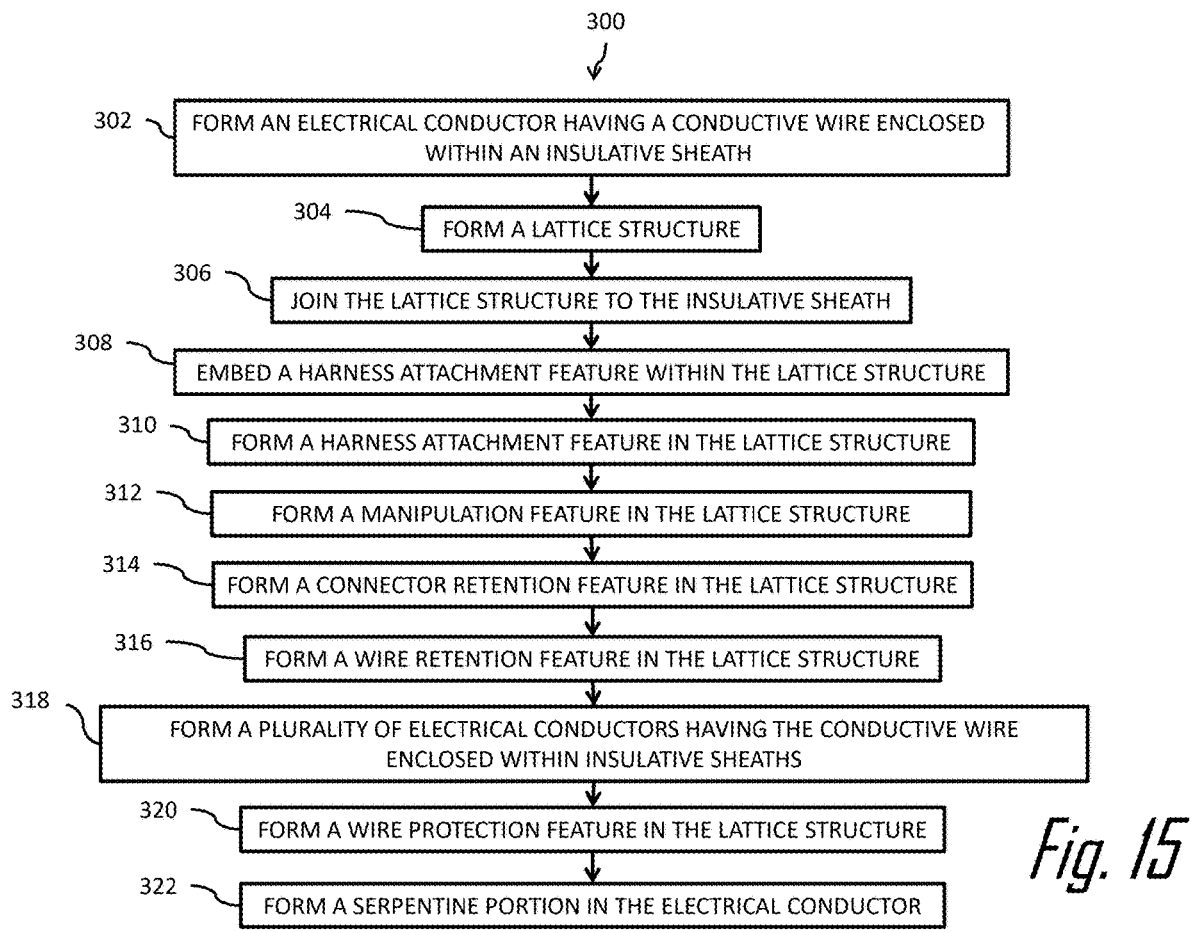

ELECTRICAL WIRING HARNESS ASSEMBLY AND PROCESS FOR MANUFACTURING SAME

CROSS-REFERENCE TO RELATED APPLICATION

This application is a continuation application and claims the benefit of U.S. patent application Ser. No. 16/203,703, filed Nov. 29, 2018, which claims benefit under 35 U.S.C. § 119(e) of U.S. Provisional Patent Application No. 62/671,607, filed on May 15, 2018, the entire disclosure of which is hereby incorporated herein by reference.

TECHNICAL FIELD OF THE INVENTION

The invention generally relates to an electrical wiring harness assembly, particularly an electrical wiring harness assembly suited for automated manufacture and installation and a process for manufacturing this electrical wiring harness assembly.

BRIEF DESCRIPTION OF THE SEVERAL VIEWS OF THE DRAWING

The present invention will now be described, by way of example with reference to the accompanying drawings, in which:

FIG. 8A is a perspective view of an electrical wiring harness subassembly having a serpentine portion formed in the first step of the manufacturing process, according to an embodiment of the invention;

FIG. 8B is a top view of the electrical wiring harness subassembly of FIG. 8A, according to an embodiment of the invention;

FIG. 8C is a close up top view of the serpentine portion of the electrical wiring harness subassembly of FIG. 8A shown in Detail A of FIG. 8B, according to an embodiment of the invention;

FIG. 8D is a cross section view of the serpentine portion of the electrical wiring harness subassembly of FIG. 8A viewed from the section line B-B of FIG. 8C, according to an embodiment of the invention;

FIG. 9A is a perspective view of an electrical wiring harness subassembly having several wire retention features formed in the second step of the manufacturing process, according to an embodiment of the invention;

FIG. 9B is a top view of the electrical wiring harness subassembly of FIG. 9A, according to an embodiment of the invention;

FIG. 9C is a close up top view of the wire retention features of the electrical wiring harness subassembly of FIG. 9A shown in Detail A of FIG. 9B, according to an embodiment of the invention;

FIG. 9D is a cross section view of the wire retention features of the electrical wiring harness subassembly of FIG. 9A viewed from the section line C-C of FIG. 9C, according to an embodiment of the invention;

FIG. 9E is a close up perspective view of the wire retention features of the electrical wiring harness subassembly of FIG. 9A shown in Detail B of FIG. 9A, according to an embodiment of the invention;

FIG. 10A is a top view of an electrical wiring harness subassembly having several harness attachment features embedded in the electrical wiring harness subassembly during the second step of the manufacturing process, according to an embodiment of the invention;

FIG. 10B is a close up top view of the harness attachment features of the electrical wiring harness subassembly of FIG. 10A shown in Detail A, according to an embodiment of the invention;

FIG. 10C is a cross section view of the harness attachment features of the electrical wiring harness subassembly of FIG. 10A viewed from the section line B-B of FIG. 10B, according to an embodiment of the invention;

FIG. 12A is a perspective view of the electrical wiring harness assembly of FIG. 1, according to an embodiment of the invention;

FIG. 12B is a top view of the electrical wiring harness subassembly of FIG. 12A, according to an embodiment of the invention;

FIG. 12C is a close up perspective view of a connector disposed in a connector attachment feature as shown in Detail A of FIG. 12A, according to an embodiment of the invention;

FIG. 12D is a close up perspective view of another connector disposed in another connector attachment feature as shown in Detail B of FIG. 12A, according to an embodiment of the invention;

FIG. 12E is a close up perspective view of yet another connector disposed in yet another connector attachment feature as shown in Detail C of FIG. 12A, according to an embodiment of the invention;

FIG. 12F is a close up perspective view of another wire retention feature as shown in Detail D of FIG. 12B, according to an embodiment of the invention;

FIG. 12G is a close up perspective view of yet another wire retention feature as shown in Detail E of FIG. 12B, according to an embodiment of the invention;

FIG. 12H is a side view of the electrical wiring harness subassembly of FIG. 12A, according to an embodiment of the invention;

FIG. 12I is an alternative side view of the electrical wiring harness subassembly of FIG. 12A, according to an embodiment of the invention;

FIG. 13A is a close up perspective view of a wire protection feature formed in the second step of the manufacturing process, according to an embodiment of the invention;

FIG. 13B is a close up perspective view of another wire protection feature formed in the second step of the manufacturing process, according to an embodiment of the invention;

FIG. 15 is a flow chart of a method of operating the apparatus of FIG. 14 to manufacture the electrical wiring harness assembly of FIG. 1, in accordance with an embodiment of the invention.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The examples presented herein are directed to assemblies in which the conductors are wire electrical conductors. However, other embodiments of the assembly, may be envisioned wherein the conductors are fiber optic, pneumatic, hydraulic conductors, or a hybrid assembly having combination of any of these conductors.

Figure 1:
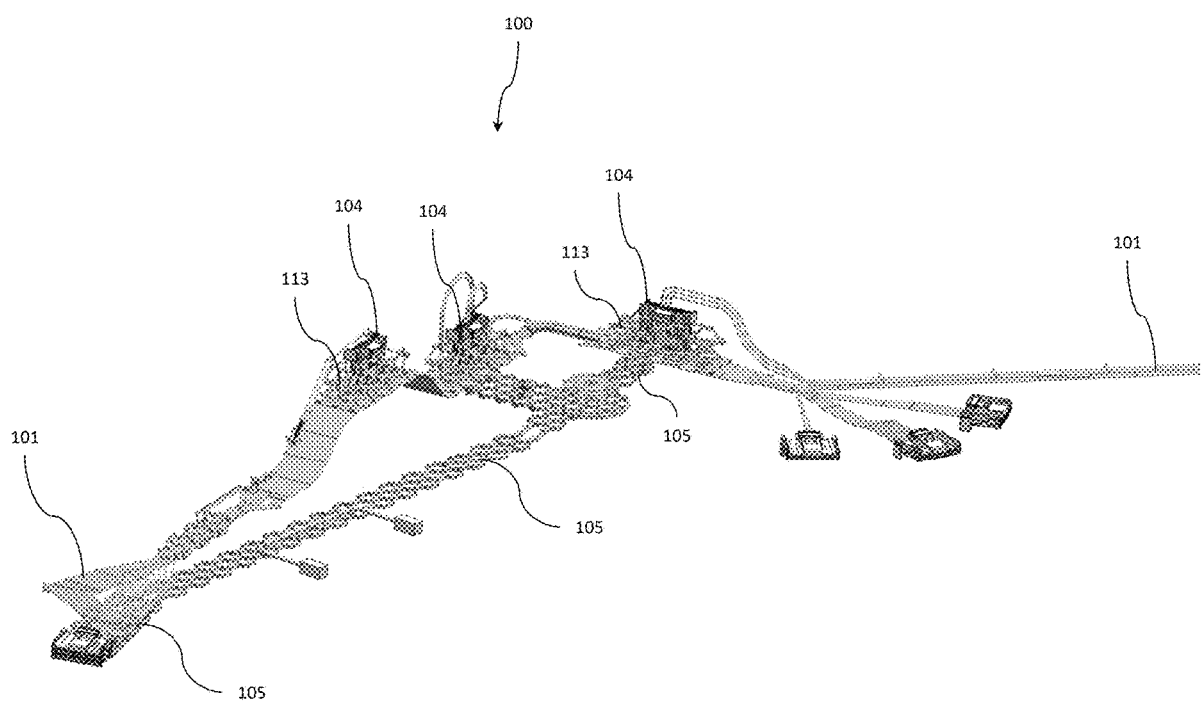
FIG. 1 is a perspective view of an electrical wiring harness assembly, according to an embodiment of the invention.
Figure 2:
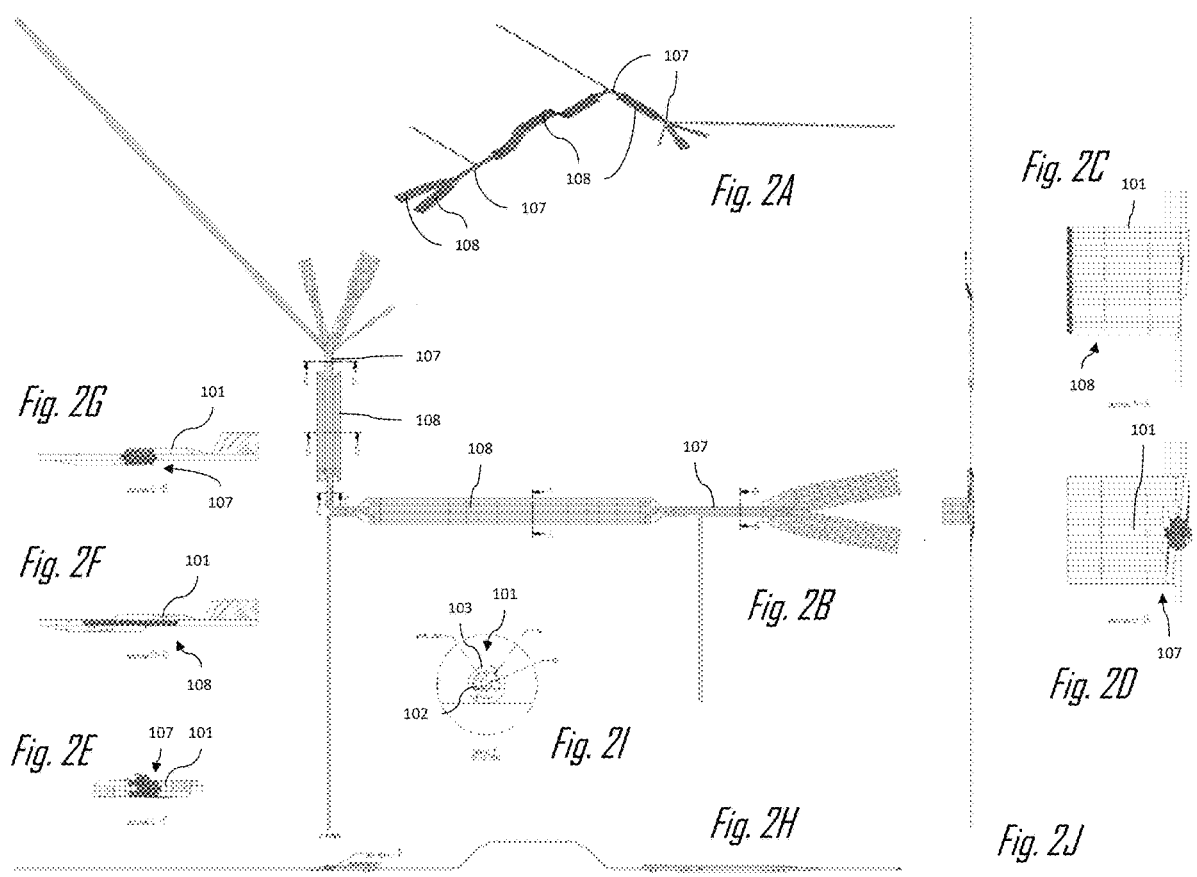
FIG. 2A is a perspective view of an electrical wiring harness subassembly in a first step of the manufacturing process, according to an embodiment of the invention.
FIG. 2B is a top view of the electrical wiring harness subassembly of FIG. 2A, according to an embodiment of the invention.
FIG. 2C is a cross section view of the electrical wiring harness subassembly of FIG. 2A viewed from the section line A-A, according to an embodiment of the invention.
FIG. 2D is a cross section view of the electrical wiring harness subassembly of FIG. 2A viewed from the section line B-B, according to an embodiment of the invention.
FIG. 2E is a cross section view of the electrical wiring harness subassembly of FIG. 2A viewed from the section line C-C, according to an embodiment of the invention.
FIG. 2F is a cross section view of the electrical wiring harness subassembly of FIG. 2A viewed from the section line D-D, according to an embodiment of the invention.
FIG. 2G is a cross section view of the electrical wiring harness subassembly of FIG. 2A viewed from the section line E-E, according to an embodiment of the invention.
FIG. 2H is a side view of the electrical wiring harness subassembly of FIG. 2A, according to an embodiment of the invention.
FIG. 2I is a close up view of the electrical wiring harness subassembly shown in Detail F of FIG. 2A, according to an embodiment of the invention.
FIG. 2J is an alternative side view of the electrical wiring harness subassembly of FIG. 2A, according to an embodiment of the invention.

FIG. 1 illustrates an example of an automotive wiring harness assembly according to an embodiment of this invention, hereinafter referred to as the assembly 100. The assembly 100 includes a plurality of electrical conductors 101 having wires 102 that are formed of an electrically conductive material, e.g. a metallic alloy, carbon nanostructures, and/or electrically conductive polymers. These wires 102 are separated from one another and are enclosed within, i.e. surrounded by, insulative sheaths 103 that are integrally formed of an electrically insulative material, e.g. a dielectric polymer. The wires 102 are terminated by terminals (not shown) contained in connectors 104 that allow the electrical conductors 101 to be interconnected to other wire harness assemblies, electronic modules, or other electrical devices (not shown).

The assembly 100 also includes a lattice support structure 105 that is attached to the insulative sheaths 103 at multiple locations. The lattice support structure 105 is configured to maintain a desired shape of the assembly 100. The lattice support structure 105 is formed of filaments 106 made of the same material as the insulative sheaths 103. In alternative embodiments, the lattice structure may be formed of a different material than the insulative sheaths 103. The filaments 106 are arranged such that lattice support structure 105 defines a plurality of hexagonally shaped apertures 112.

The assembly 100, particularly the lattice support structure 105, may be advantageously formed by an automated additive manufacturing process, e.g. 3D printing, stereolithography, digital light processing, fused deposition modeling, fused filament fabrication, selective laser sintering, selecting heat sintering, multi-jet modeling, multi jet fusion, electronic beam melting, and/or laminated object manufacturing.

FIGS. 2A-2J illustrate a first sub-assembly that is formed during a step of the process of manufacturing the assembly 100. As can best be seen in FIGS. 2D and 2G, the first sub-assembly has bundled portions 107 of the plurality of electrical conductors 101. The electrical conductors 101 in the bundled portion 107 are arranged such that each insulative sheath 103 is in contact with, and preferably bonded to, at least three other insulated sheaths. The sub-assembly also has flat portions 108 of the plurality of electrical conductors 101. Each insulative sheath 103 in the flat portion 108 is adjacent to at least one and no more than two other insulated sheaths.

Figure 3:
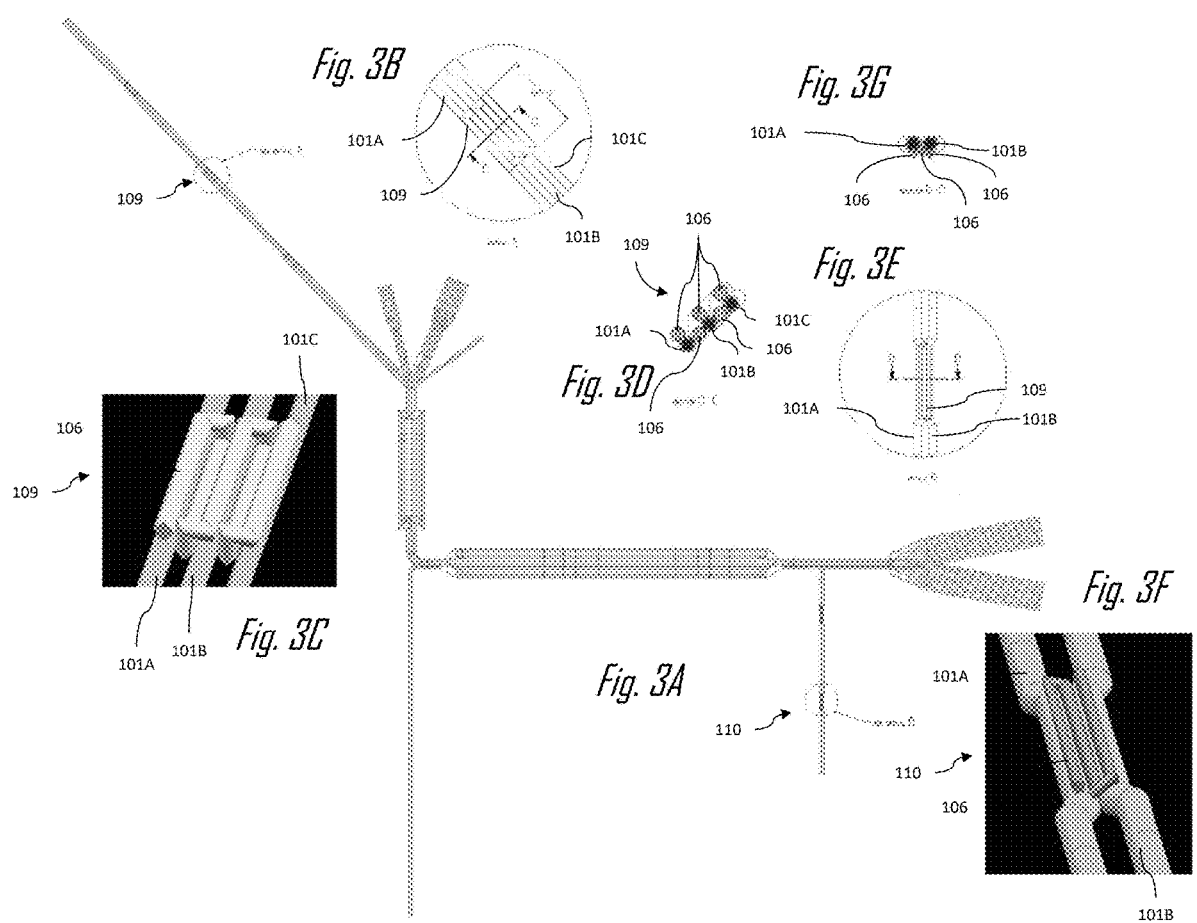
FIG. 3A is a top view of an electrical wiring harness subassembly with two types of spot tape features, according to an embodiment of the invention.
FIG. 3B is a close up top view of a first spot tape feature of the electrical wiring harness subassembly shown in Detail A of FIG. 3A, according to an embodiment of the invention.
FIG. 3C is a close up perspective view of the first spot tape feature of the electrical wiring harness subassembly shown in Detail A of FIG. 3A, according to an embodiment of the invention.
FIG. 3D is a cross section view of the first spot tape feature of the electrical wiring harness subassembly of FIG. 3A viewed from the section line C-C in FIG. 3B, according to an embodiment of the invention.
FIG. 3E is a close up top view of a second spot tape feature of the electrical wiring harness subassembly shown in Detail B of FIG. 3A, according to an embodiment of the invention.
FIG. 3F is a close up perspective view of the second spot tape feature of the electrical wiring harness subassembly shown in Detail B of FIG. 3A, according to an embodiment of the invention.
FIG. 3G is a cross section view of the second spot tape feature of the electrical wiring harness subassembly of FIG. 3A viewed from the section line D-D in FIG. 3E, according to an embodiment of the invention.

FIGS. 3A-3G illustrate a second sub-assembly that is formed during a step of the process of manufacturing the assembly 100 that includes spot tape features. These features are referred to as spot tape features because they secure two or more electrical conductors 101 together as was previously accomplished by wrapping an adhesive tape around various locations, i.e. spots, on the more electrical conductors 101. FIGS. 3A-3G illustrate two different spot tape features. A first spot tape feature 109 shown in FIGS. 3B-3D maintains a gap or spacing between the electrical conductors 101. A continuous filament made of the same material as the insulative sheaths 103 is applied to, and bonded with, an outer surface of the insulative sheaths 103. In alternative embodiments, the filament 106 of the first spot tape feature 109 may be formed of a different material than the insulative sheaths 103. The filament 106 has a square diamond cross section rather than a round cross section. As best shown in FIG. 3C, the filament is applied to a top surface of a first conductor 101A, between the first conductor 101A and a second conductor 101B, to a top surface of the second conductor 101B, between the second conductor 101B and a third conductor 101C, and then to a top surface of the third conductor 101C. A second spot tape feature 110 shown in FIGS. 3F-3F is applied to electrical conductors 101 wherein the insulative sheaths 103 are contacting each other. As best shown in FIG. 3C, a continuous filament made of the same material as the insulative sheaths 103 is applied to, and bonded with, a top surface of a first conductor, between the first and a second conductor, to a top surface of the second conductor, between the second and a third conductor, and then to a top surface of the third conductor. In alternative embodiments, the filament of the second spot tape feature 110 may be formed of a different material than the insulative sheaths 103.

Figure 4:
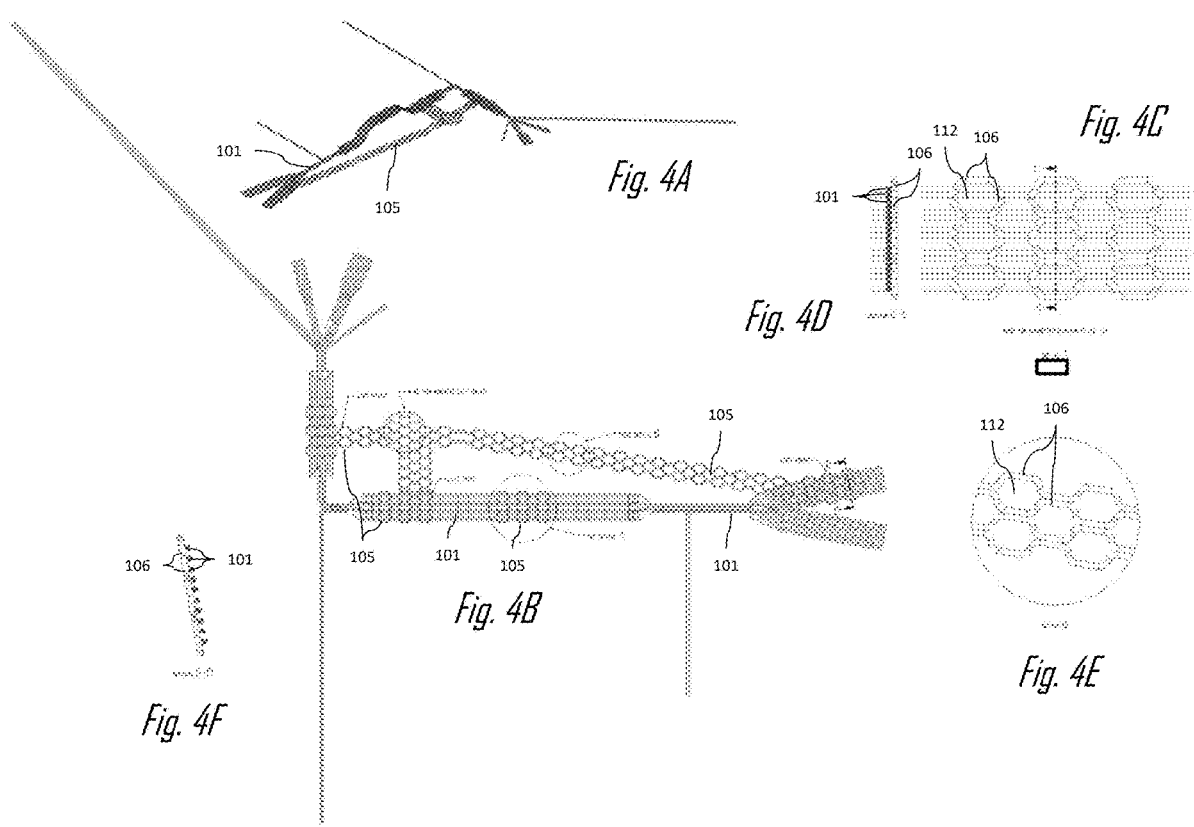
FIG. 4A is a perspective view of an electrical wiring harness subassembly having several lattice features formed in a second step of the manufacturing process, according to an embodiment of the invention.
FIG. 4B is a top view of the electrical wiring harness subassembly of FIG. 4A, according to an embodiment of the invention.
FIG. 4C is a close up view of a first lattice feature of the electrical wiring harness subassembly of FIG. 4A shown in Detail A of FIG. 4B, according to an embodiment of the invention.
FIG. 4D is a cross section view of the first lattice feature of the electrical wiring harness subassembly of FIG. 4A viewed from the section line C-C in FIG. 4C, according to an embodiment of the invention.
FIG. 4E is a close up view of a second lattice feature of the electrical wiring harness subassembly of FIG. 4A shown in Detail B of FIG. 4B, according to an embodiment of the invention.
FIG. 4F is a cross section view of the electrical wiring harness subassembly of FIG. 4A viewed from the section line D-D of FIG. 4B, according to an embodiment of the invention.

FIGS. 4A-4F illustrate a third sub-assembly that is formed during a step of the process of manufacturing the assembly 100 that includes the lattice support structure 105. The filaments 106 in the lattice support structure 105 are formed into serpentine shapes that are joined to adjacent filaments 106 to define a number of hexagonal apertures 112 in the lattice support structure 105 as shown in FIG. 4E. Each of the filaments 106 has a generally round cross section. As best shown in FIGS. 4C and 4D, the lattice support structure 105 may be configured to maintain contact between adjacent electrical conductors 101. Alternatively, as shown in FIG. 4F, the lattice support structure 105 may be configured to maintain a gap between adjacent electrical conductors 101.

Figure 5:
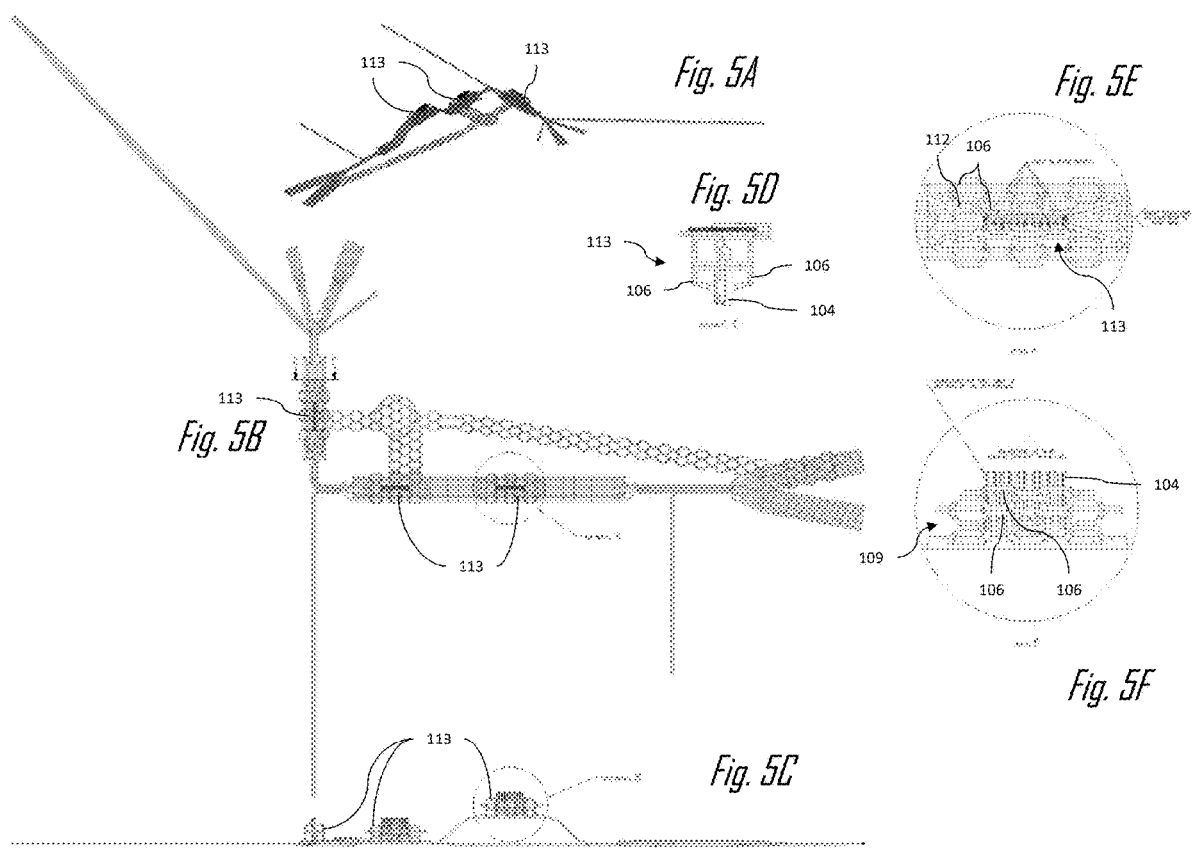
FIG. 5A is a perspective view of an electrical wiring harness subassembly having several connector attachment features formed in the second step of the manufacturing process, according to an embodiment of the invention.
FIG. 5B is a top view of the electrical wiring harness subassembly of FIG. 5A, according to an embodiment of the invention.
FIG. 5C is a side view of the electrical wiring harness subassembly of FIG. 5A, according to an embodiment of the invention.
FIG. 5D is a cross section view of the electrical wiring harness subassembly of FIG. 5A viewed from the section line C-C in FIG. 5B, according to an embodiment of the invention.
FIG. 5E is a close up top view of the connector attachment feature of the electrical wiring harness subassembly of FIG. 5A shown in Detail A of FIG. 5B, according to an embodiment of the invention.
FIG. 5F is a close up side view of the connector attachment feature of the electrical wiring harness subassembly of FIG. 5A shown in Detail B of FIG. 5C, according to an embodiment of the invention.

FIGS. 5A-5F illustrate a third sub-assembly that is formed during a step of the process of manufacturing the assembly 100 that includes a connector retention feature 113 that is integrated with the lattice support structure 105. The connector retention feature 113 is configured retain a connector 104 to the assembly 100 until removed by a human or robotic assembler for connection with a corresponding electrical connector. As shown in FIGS. 5D-5F, the connector retention feature 113 is formed of the same type of filaments 106 forming the lattice support structure 105. The connector retention feature 113 surrounds the connector 104 to keep it in an upright position in which the electrical conductors 101 terminated in the connector 104 are pointed away from the assembly 100. The connector 104 is maintained in a predetermined location to assist location and manipulation of the connector 104 by the human or robotic assembler.

Figure 6:
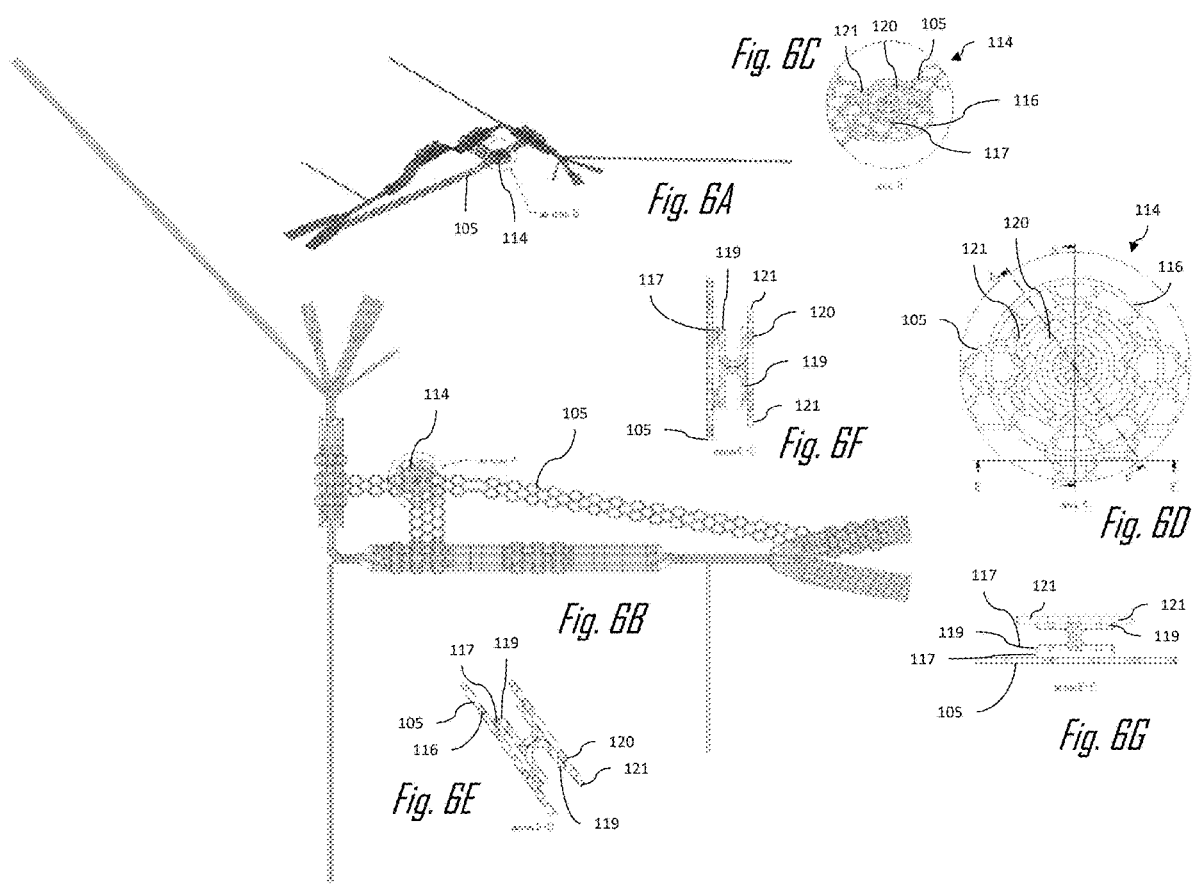
FIG. 6A is a perspective view of an electrical wiring harness subassembly having a manipulation feature formed in the second step of the manufacturing process, according to an embodiment of the invention.
FIG. 6B is a top view of the electrical wiring harness subassembly of FIG. 6A, according to an embodiment of the invention.
FIG. 6C is a close up perspective view of the manipulation feature of the electrical wiring harness subassembly of FIG. 6A shown in Detail B of FIG. 6A, according to an embodiment of the invention.
FIG. 6D is a close up top view of the manipulation feature of the electrical wiring harness subassembly of FIG. 6A shown in Detail A of FIG. 6B, according to an embodiment of the invention.
FIG. 6E is a cross section view of the manipulation feature of the electrical wiring harness subassembly of FIG. 6A viewed from the section line C-C of FIG. 6D, according to an embodiment of the invention.
FIG. 6F is a cross section view of the manipulation feature of the electrical wiring harness subassembly of FIG. 6A viewed from the section line D-D of FIG. 6D, according to an embodiment of the invention.
FIG. 6G is a cross section view of the manipulation feature of the electrical wiring harness subassembly of FIG. 6A viewed from the section line E-E of FIG. 6D, according to an embodiment of the invention.
Figure 7:
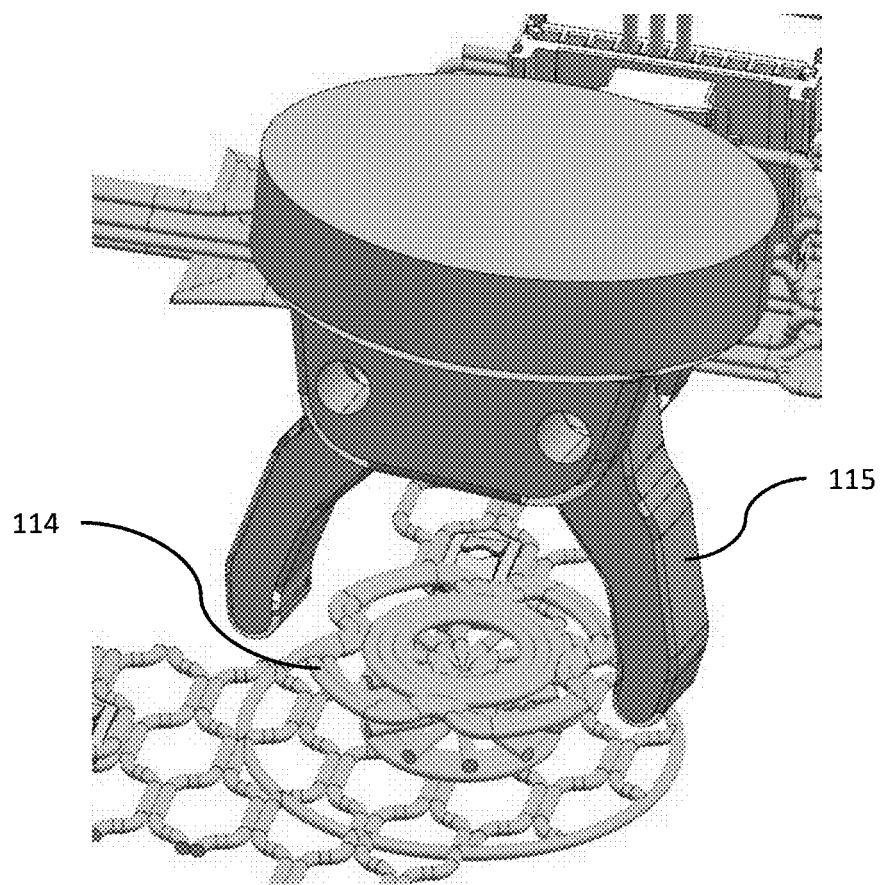
FIG. 7 is a perspective view of a robotic manipulator gripping the manipulation feature of the electrical wiring harness subassembly of FIG. 6A, according to an embodiment of the invention.

FIGS. 6A-6G illustrate a fourth sub-assembly that is formed during a step of the process of manufacturing the assembly 100 that includes a manipulation feature 114 that is integrated with the lattice support structure 105. The manipulation feature 114 is formed of the same type of filaments 106 forming the lattice support structure 105. The manipulation feature 114 is configured to be gripped by a robotic actuator 115 of the robotic assembler as shown in FIG. 7. As best shown in FIG. 6C, the manipulation feature 114 includes a support ring 116 that is formed of a single filament that is integrated with the lattice support structure 105. The manipulation feature 114 also includes a base ring 117 attached to the lattice support structure 105 near the center of the support ring 116. The base ring 117 is formed of several concentric filaments formed of the same type of filaments 106 forming the lattice support structure 105. As best shown in FIGS. 6F and 6G, the manipulation feature 114 further includes a plurality of U-shaped supports 119 radially arranged about, and attached to, the base ring 117. The U-shaped supports 119 are attached to an upper ring 120 that is generally coaxial with, and parallel to, the base ring 117. The U-shaped supports 119 are formed of the same type of filaments 106 forming the lattice support structure 105. The upper ring 120 is also formed of several concentric filaments formed of the same type of filaments 106 forming the lattice support structure 105. The upper ring 120 is surrounded by a number of lobes 121 formed of the same type of filaments 106 forming the lattice support structure 105. The lobes 121 are coplanar with the upper ring 120.

FIGS. 8A-8D illustrate a fifth sub-assembly that is formed during a step of the process of manufacturing the assembly 100 that includes a resilient serpentine portion 122 of the electrical conductors 101. The serpentine portion 122 forms retractile cords that are configured to stretch out when is tension and return to their original shape when tensile forces are removed.

FIGS. 9A-9E illustrate a sixth sub-assembly that is formed during a step of the process of manufacturing the assembly 100 that includes a first wire retention feature 123 in the lattice support structure 105. The first wire retention feature 123 is configured retain a wire harness 124 that is manufactured separately from the assembly 100, e.g. a jumper wire harness. The first wire retention feature 123 is formed of filaments 106 formed of the same type of filaments 106 forming the lattice support structure 105. As best shown in FIG. 9E, the first wire retention feature 123 is in the form of a number of loops 125 that extend from the lattice support structure 105 over the wire harness 124. The loops 125 may be open so that the wire harness 124 may be detached from the assembly 100 or the loops 125 may be closed such that the wire harness 124 is permanently attached to the assembly 100.

FIGS. 10A-10C illustrate a seventh sub-assembly that is formed during a step of the process of manufacturing the assembly 100 that includes a first harness attachment feature 126 that is embedded in the lattice support structure 105. The first harness attachment feature 126 is configured to attach the assembly 100 to an external structure (not shown), e.g. a vehicle panel. As best shown in FIGS. 10B and 10C, the first harness attachment feature 126 includes a metallic clip 127 that is configured to receive a stud (not shown) which may be threaded or unthreaded. The clip 127 is secured to the lattice support structure 105 by filaments 106 that overlap the edges of the clip 127. These filaments 106 are formed of the same type of filaments 106 used to construct the lattice support structure 105.

Figure 11A:
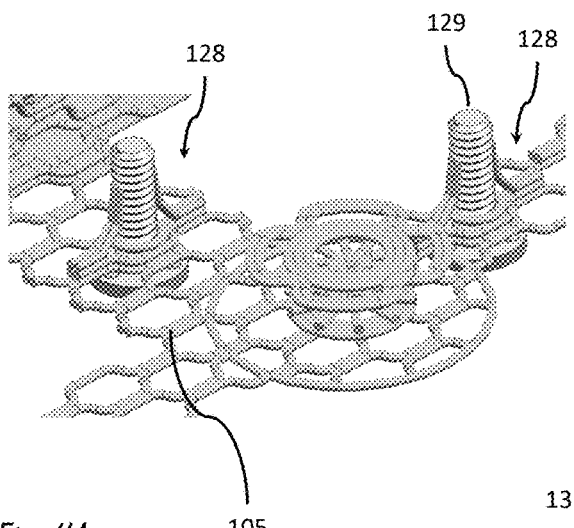
FIG. 11A is a perspective view of an electrical wiring harness subassembly having several threaded harness attachment features embedded in the electrical wiring harness subassembly during the second step of the manufacturing process, according to an embodiment of the invention.
Figure 11B:
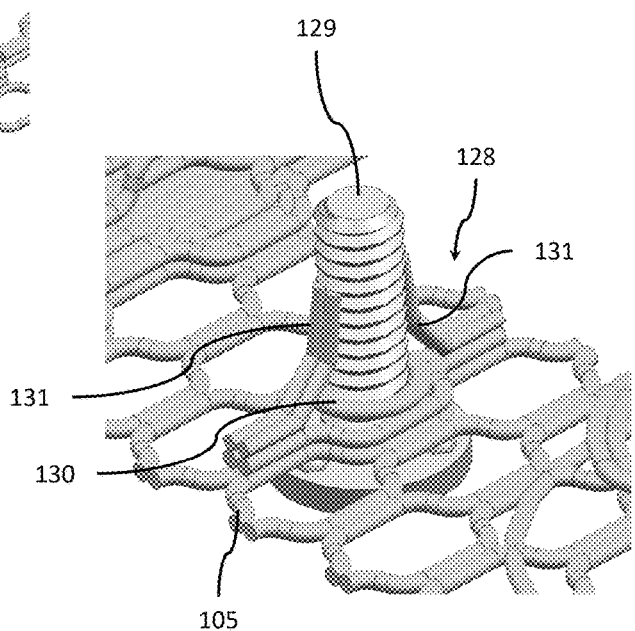
FIG. 11B is a close up perspective view of one of treaded harness attachment features of the electrical wiring harness subassembly of FIG. 11A, according to an embodiment of the invention.

FIGS. 11A and 11B illustrate an alternative embodiment of a second harness attachment feature 128 that is formed by the lattice support structure 105. The second harness attachment feature 128 is configured to attach the assembly 100 to an external structure (not shown), e.g. a vehicle panel. As best shown in FIGS. 10B and 10C, the second harness attachment feature 128 is formed of filaments 106 that are configured to receive a threaded stud 129. As shown in FIGS. 11A and 11B, the second harness attachment feature 128 includes a ring structure 130 attached to the lattice support structure 105 in which the stud 129 is received. The filaments 106 forming the ring structure 130 have a generally round cross section. The second harness attachment feature 128 also includes a number of filaments 131 attached to and extending from the lattice support structure 105. These filaments 131 have a square diamond shaped cross section and are configured to engage the threads of the threaded stud 129, thereby inhibiting removal of the stud 129 from the second harness attachment feature 128.

FIGS. 12A-12I illustrate various views of the assembly 100. FIGS. 12C-12E show views of various connectors 104 held by the connector retention features 113 as shown in FIGS. 5A-5F. FIGS. 12F and 12G illustrates a second wire retention feature 132 that is configured retain an electrical conductor 101 to the assembly 100. The second wire retention feature 132 is formed of filaments 106 formed of the same type of filaments 106 forming the lattice support structure 105. As best shown in FIG. 12G, the second wire retention feature 132 is a filament that is attached to the insulative sheath 103 of one electrical conductor 101 and overlays a plurality of electrical conductors 101. The second wire retention feature 132 is spaced apart from the plurality of electrical conductors 101 and another section of the plurality of electrical conductors 101 is looped back and secured under the second wire retention feature 132 as shown in FIGS. 12H and 12I. One end of the second wire retention feature 132 is open so that the looped electrical conductors 101 may be detached from the assembly 100.

FIGS. 13A and 13B illustrate wire protection features 133 that are configured to surrounds a section of the plurality of electrical conductors 101, thereby providing protection to the electrical conductors 101 from contact with other elements in the vehicle that could cause damage, such as abrasion, to the assembly 100. The wire protection feature 133 is formed by the lattice support structure 105 by surrounding the section of the plurality of electrical conductors 101. FIG. 13A illustrates an example of the wire protection feature 133 surrounding a flat portion 108 of the electrical conductors 101 and FIG. 13B illustrates an example of a wire protection feature 133 surrounding a bunded portion of the electrical conductors 101.

This assembly 100 lends itself to being manufactured using an automated additive manufacturing process, such as 3D printing, stereolithography, digital light processing, fused deposition modeling, fused filament fabrication, selective laser sintering, selecting heat sintering, multi-jet modeling, multi-jet fusion, electronic beam melting, and/or laminated object manufacturing. The assembly 100 may be produced by the automated additive manufacturing process having a shape that is pre-formed to be placed within the packaging accommodation for the wiring harness within a vehicle. The assembly 100 is also well suited for robotic placement of the assembly 100 within the vehicle.

Figure 14:
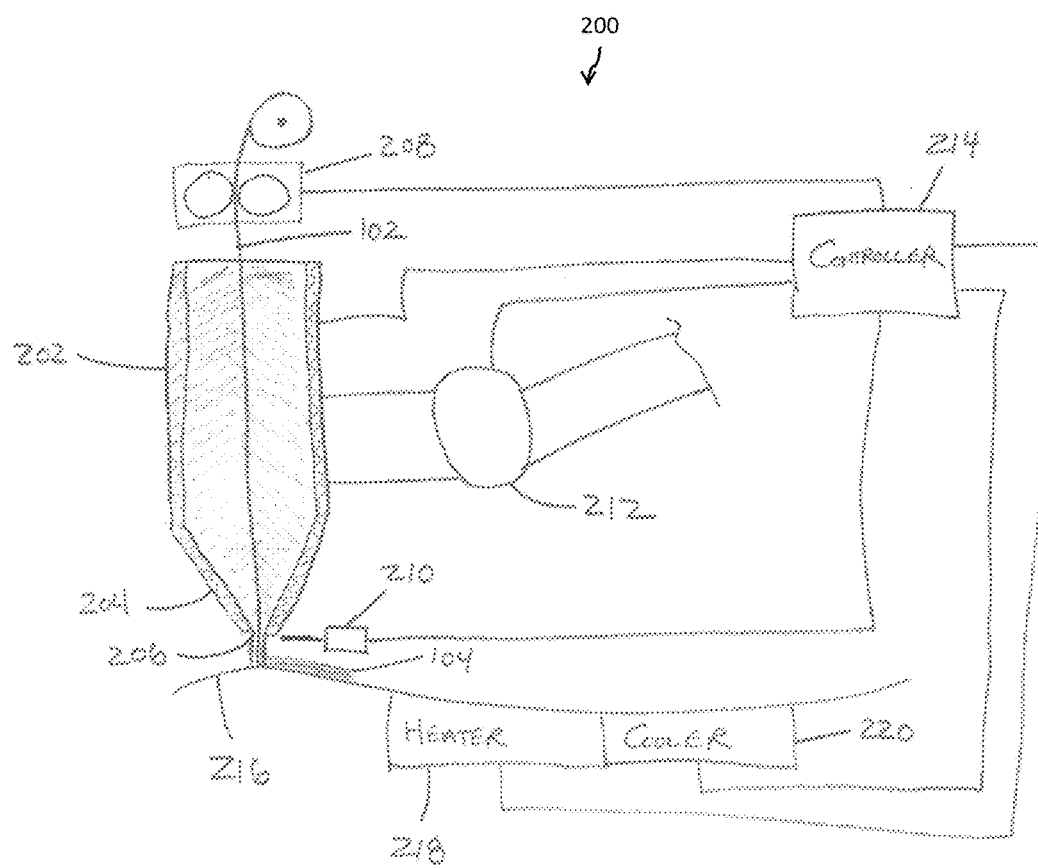
FIG. 14 is a schematic view of an apparatus configured to manufacture the electrical wiring harness assembly of FIG. 1, in accordance with an embodiment of the invention.

Also presented herein is an apparatus that can be used to manufacture the assembly 100 described above. FIG. 14 illustrates an 3D printing apparatus according to an embodiment of the invention, hereinafter referred to as the apparatus 200. The apparatus 200 includes an extruding device 202 with a dispensing head 204 that selectively dispenses a dielectric thermoplastic material though an orifice 206 in the dispensing head 204. The thermoplastic material may be provided to the dispensing head 204 in the form of a thermoplastic filament, as used in filament deposition modeling, thermoplastic pellets, and/or a thermoplastic powder.

The apparatus 200 also includes a wire feed device 208 that selectively feeds an electrically conductive wire, hereinafter referred to as the wire 102, through the orifice 206. A cutting device 210 that is configured to selectively sever the wire 102 after it passes through the orifice 206 is also included in the apparatus 200. The wire 102 may already be surrounded by an insulative sheath prior to passing through the orifice 206.

This apparatus 200 further comprises an electromechanical device 212, such as a robotic arm, that holds the extruding device 202, the wire feed device 208, and the cutting device 210 and is configured to move the extruding device 202, the wire feed device 208, and the cutting device 210 within a 3D space.

The apparatus 200 additionally encompasses an electronic controller 214 that is in communication with the extruding device 202, the wire feed device 208, the cutting device 210, and the electromechanical device 212. The electronic controller 214 has one or more processors and memory. The processors may be a microprocessors, application specific integrated circuits (ASIC), or built from discrete logic and timing circuits (not shown). Software instructions that program the processors may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The memory device contains instructions that cause the electronic controller 214 to send commands to the electromechanical device 212 that direct the electromechanical device 212 to move the extruding device 202, the wire feed device 208, and the cutting device 210 within the 3D space. The memory device also contains instructions that cause the electronic controller 214 to send commands to the extruding device 202 to directing it to selectively dispense the dielectric material though the orifice 206. The memory device further contains instructions that cause the electronic controller 214 to send commands to wire feed device 208 to instruct it to selectively feed the wire 102 through the orifice 206 and cause the cutting device 210 to selectively sever the wire 102.

The memory device may also contain contains instructions that cause the electronic controller 214 to send commands to the extruding device 202 that direct the extruding device 202 to selectively dispense the dielectric material though the orifice 206 as the electromechanical device moves the extruding device 202 in the 3D space to form the filaments 106, without causing the wire feed device 208 to selectively feed the wire 102 through the orifice 206, and without causing the cutting device 210 to selectively sever the wire 102.

The memory device may further contain contains instructions that cause the electronic controller 214 to send commands to the extruding device 202, the wire feed device 208 the cutting device 210 that direct the extruding device 202 to selectively dispense the dielectric material though the orifice 206 as the electromechanically device moves the extruding device 202 in the 3D space to form the insulative sheath 103, cause the wire feed device 208 to selectively feed the wire 102 through the orifice 206, and the cutting device 210 to selectively sever the wire 102 as the electromechanically device moves the wire feed device 208 and the cutting device 210 in the 3D space to form a plurality of wires 102 formed of the wire 102 that are subsequently encased within the insulative sheath 103 by the extruding device 202.

According to an alternative embodiment of the apparatus 200, the apparatus 200 further includes a 3D curved surface 216 upon which the extruding device 202 selectively dispenses the dielectric material and the wire feed device 208 to selectively deposits the conductive wire. This 3D curved surface 216 provides the benefit of forming the assembly 100 with a predetermined shape.

This alterative embodiment may also include a heating device 218 in communication with the electronic controller 214 and is configured to heat a portion of the 3D curved surface 216. The memory device may further contain contains instructions that cause the electronic controller 214 to send commands to the heating device 218 to selectively heat the portion of the curved surface 216. This feature provides the benefit of heating the thermoplastic material while forming the insulative sheath 103 in order to produce a desired shape or material properties.

This alterative embodiment may additionally or alternatively include a cooling device 220 that is also in communication with the electronic controller 214 and is configured to cool a portion of the 3D curved surface 216. This feature provides the benefit of cooling the thermoplastic material while forming the insulative sheath 103 in order to produce a desired shape or material properties. The heating device 218 and the cooling device 220 may be the same device, e.g. a thermoelectric device.

Additionally, a method 300 of operating the apparatus 200, as described above, to manufacture the assembly 100, also as described above is presented herein. FIG. 11 illustrates an example of a method 300 of forming an automotive wiring harness assembly, hereinafter referred to as the assembly 100 using an apparatus 200 comprising an extruding device 202 having a dispensing head 204, a wire feed device 208, a cutting device 210, an electromechanical device 212, and an electronic controller 214 in communication with the extruding device 202, the wire feed device 208, the cutting device 210, and the electromechanical device 212.

The steps of the method 300 of operating the apparatus 200 are described below:

STEP 302, FORM AN ELECTRICAL CONDUCTOR HAVING A CONDUCTIVE WIRE ENCLOSED WITHIN AN INSULATIVE SHEATH, includes forming an electrical conductor having the conductive wire enclosed within an insulative sheath formed of the dielectric material via the apparatus. The electronic controller executes the instructions that commands the electromechanical device to move the extruding device, the wire feed device, and the cutting device within the 3D space, commands the extruding device to dispense the dielectric material though the orifice, commands the wire feed device to feed the conductive wire through the orifice, and commands the cutting device to selectively sever the conductive wire. The lattice support structure may comprises a plurality of extruded filaments 106. The plurality of extruded filaments 106 may be joined to one another to form the plurality of apertures 112. Each aperture in the plurality of apertures 112 may define a hexagonal shape;

STEP 304, FORM A LATTICE SUPPORT STRUCTURE, includes forming a lattice support structure 105 formed of the dielectric material defining a plurality of apertures 112 via the apparatus 200, wherein the electronic controller 214 executes the instructions that commands the electromechanical device 212 to move the extruding device 202, the wire feed device 208, and the cutting device 210 within the 3D space and commands the extruding device 202 to dispense the dielectric material though the orifice 206. The electronic controller 214 may not execute the instructions that commands the wire feed device 208 to feed the wire 102 through the orifice 206 during STEP 302;

STEP 306, JOIN THE LATTICE SUPPORT STRUCTURE TO THE INSULATIVE SHEATH, is an optional step that includes joining the lattice support structure 105 to the insulative sheath 103 at a first location and a second location distinct from the first location;

STEP 308, EMBED A HARNESS ATTACHMENT FEATURE WITHIN THE LATTICE SUPPORT STRUCTURE, is an optional step that includes embedding a harness attachment feature within the lattice support structure 105. The electronic controller 214 executes the instructions that commands the electromechanical device 212 to move the extruding device 202, the wire feed device 208, and the cutting device 210 within the 3D space and commands the extruding device 202 to dispense the dielectric material though the orifice 206 around the harness attachment feature, wherein the harness attachment feature is configured to attach the assembly 100 to an external structure;

STEP 310, FORM A HARNESS ATTACHMENT FEATURE IN THE LATTICE SUPPORT STRUCTURE, is an optional step that includes forming a harness attachment feature 126, 128 in the lattice support structure 105, wherein the electronic controller 214 executes the instructions that commands the electromechanical device 212 to move the extruding device 202, the wire feed device 208, and the cutting device 210 within the 3D space and commands the extruding device 202 to dispense the dielectric material though the orifice 206, thereby forming the harness attachment feature 126, 128, wherein the harness attachment feature 126, 128 is configured to attach the assembly 100 to an external structure;

STEP 312, FORM A MANIPULATION FEATURE IN THE LATTICE SUPPORT STRUCTURE, is an optional step that includes forming a manipulation feature 114 in the lattice support structure 105. The electronic controller 214 executes the instructions that commands the electromechanical device 212 to move the extruding device 202, the wire feed device 208, and the cutting device 210 within the 3D space and commands the extruding device 202 to dispense the dielectric material though the orifice 206, thereby forming the manipulation feature 114, wherein the harness attachment feature is configured to grasp and manipulate the assembly 100;

STEP 314, FORM A CONNECTOR RETENTION FEATURE IN THE LATTICE SUPPORT STRUCTURE, is an optional step that includes forming a connector retention feature 113 in the lattice support structure 105. The electronic controller 214 executes the instructions that commands the electromechanical device 212 to move the extruding device 202, the wire feed device 208, and the cutting device 210 within the 3D space and commands the extruding device 202 to dispense the dielectric material though the orifice 206, thereby forming the connector retention feature 113, wherein the connector retention feature 113 is configured retain a connector terminating the electrical conductor;

STEP 316, FORM A WIRE RETENTION FEATURE IN THE LATTICE SUPPORT STRUCTURE, is an optional step that includes forming a wire retention feature 123, 132 in the lattice support structure 105. The electronic controller 214 executes the instructions that commands the electromechanical device 212 to move the extruding device 202, the wire feed device 208, and the cutting device 210 within the 3D space and commands the extruding device 202 to dispense the dielectric material though the orifice 206, thereby forming the wire retention feature 123, 132;

STEP 318, FORM A PLURALITY OF ELECTRICAL CONDUCTORS HAVING THE CONDUCTIVE WIRE ENCLOSED WITHIN INSULATIVE SHEATHS, is an optional step that includes forming a plurality of electrical conductors 101 having the wire 102 enclosed within insulative sheaths 103 formed of the dielectric material via the apparatus 200. The electronic controller 214 executes the instructions that commands the electromechanical device 212 to move the extruding device 202, the wire feed device 208, and the cutting device 210 within the 3D space, commands the extruding device 202 to dispense the dielectric material though the orifice 206, commands the wire feed device 208 to feed the wire 102 through the orifice 206, and commands the cutting device 210 to selectively sever the wire 102. Each insulative sheath 103 in a bundled portion 107 of the plurality of electrical conductors 101 contacts at least three other insulated sheaths. Each insulative sheath 103 in a flat portion 108 of the plurality of electrical conductors 101 portion is adjacent to at least one and no more than two other insulated sheaths;

STEP 320, FORM A WIRE PROTECTION FEATURE IN THE LATTICE SUPPORT STRUCTURE, is an optional step that includes forming a wire protection feature 133 in the lattice support structure 105 that surrounds a section of the plurality of electrical conductors 101. The electronic controller 214 executes the instructions that commands the electromechanical device 212 to move the extruding device 202, the wire feed device 208, and the cutting device 210 within the 3D space and commands the extruding device 202 to dispense the dielectric material though the orifice 206, thereby forming the wire protection feature 133; and STEP 322, FORM A SERPENTINE PORTION IN THE ELECTRICAL CONDUCTOR, is an optional step that includes forming a serpentine portion 122 in the electrical conductor 101. The electronic controller 214 executes the instructions that commands the electromechanical device 212 to move the extruding device 202, the wire feed device 208, and the cutting device 210 in a serpentine pattern within the 3D space, commands the extruding device 202 to dispense the dielectric material though the orifice 206 while moving the extruding device 202, the wire feed device 208, and the cutting device 210 in the serpentine pattern within the 3D space, and commands the wire feed device 208 to feed the wire 102 through the orifice 206 while moving the extruding device 202, the wire feed device 208, and the cutting device 210 in the serpentine pattern within the 3D space.

Accordingly, an automotive wiring harness assembly 100, an apparatus 200 configured to form the automotive wiring harness assembly 100, and a method 300 of operating the apparatus 200 is provided. The wiring harness provides the benefits of allowing robotic assembly of the wiring harness and robotic installation of the wiring harness into a vehicle or any other subassembly.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical wiring harness, comprising:
    a lattice support structure defining a plurality of apertures, the lattice support structure formed of a dielectric material, the lattice support structure comprising a manipulation feature configured to grasp and manipulate the electrical wiring harness;
    a plurality of electrical conductors, each of the electrical conductors comprising a conductive wire enclosed within an insulated sheath, wherein the insulated sheath is formed of the dielectric material;
    a connector connected to at least one of the plurality of electrical conductors; and
    a harness attachment feature formed of the dielectric material, wherein the harness attachment feature is configured to secure the electrical wiring harness to a vehicle panel.

2. The electrical wiring harness of claim 1, further comprising a connector retention feature, wherein the connector retention feature is configured to retain the connector in a fixed connector position.

3. The electrical wiring harness of claim 1, wherein the lattice support structure further comprises a wire retention feature configured to retain a jumper wire harness.

4. The electrical wiring harness of claim 1, wherein the harness attachment feature comprises a ring structure configured to receive a stud from the vehicle panel.

5. The electrical wiring harness of claim 1, further comprising a wire protection feature configured to surround a section of the plurality of electrical conductors, wherein the wire protection feature is formed of the dielectric material.

6. The electrical wiring harness of claim 1, wherein the lattice support structure further comprises a resilient serpentine portion configured to stretch when under a tensile stress.

7. A 3D printing apparatus comprising:
    an extruding device having a dispensing head configured to dispense a dielectric material though an orifice in the dispensing head;
    a wire feed device configured to feed a conductive wire through the orifice;
    a cutting device configured to sever the conductive wire;
    an electromechanical device configured to move the extruding device, the wire feed device, and the cutting device within a 3D space; and
    an electronic controller in communication with the extruding device, the wire feed device, the cutting device, and the electromechanical device, wherein the electronic controller includes a memory device;
    wherein the 3D printing apparatus is configured to print an electrical wiring harness comprising:
        a plurality of electrical conductors, each electrical conductor comprising a conductive wire enclosed within an insulated sheath formed of the dielectric material; and
        a lattice support structure formed of the dielectric material, wherein the lattice support structure defines a plurality of apertures.

8. The 3D printing apparatus of claim 7, wherein the plurality of electrical conductors are arranged into a first sub-assembly of the electrical wiring harness and the lattice support structure is coupled to the first sub-assembly.

9. The 3D printing apparatus of claim 7, wherein the memory device contains instructions to form the lattice support structure from filaments of the dielectric material without selectively feeding the conductive wire through the orifice.

10. The 3D printing apparatus of claim 7, wherein the memory device contains instructions that:
    command the electromechanical device to move the extruding device, the wire feed device, and the cutting device within the 3D space,
    command the extruding device to selectively dispense the dielectric material though the orifice,
    command the wire feed device to selectively feed the conductive wire through the orifice, and command the cutting device to selectively sever the conductive wire.

11. The 3D printing apparatus of claim 8 further comprising a 3D curved surface, wherein the extruding device is configured to selectively dispense the dielectric material onto the 3D curved surface, the 3D curved surface configured to shape the dielectric material.

12. The 3D printing apparatus of claim 11 further comprising a heating device configured to heat a first portion of the 3D curved surface.

13. The 3D printing apparatus of claim 12 further comprising a cooling device configured to cool a second portion of the 3D curved surface.

14. A method of manufacturing an electrical wiring harness assembly, said method comprising the steps of:
   a.) providing an automated-additive apparatus comprising:
      an extruding device configured to dispense a dielectric material,
      a wire feed device configured to feed a conductive wire through the extruding device,
      a cutting device configured to sever the conductive wire, and
      an electromechanical device configured to move the automated-additive apparatus within a 3D space;
   b.) forming an electrical conductor comprising the conductive wire enclosed within
      an insulative sheath formed of the dielectric material, the step further comprising:
         i.) dispensing the dielectric material via the extruding device,
         ii.) feeding the conductive wire through the extruding device, and
         iii.) cutting the conductive wire via the cutting device;
   c.) forming a lattice support structure defining a plurality of apertures, the lattice support structure formed of the dielectric material, the step further comprising:
      i.) dispensing the dielectric material via the extruding device, and
      ii.) moving the automated-additive apparatus via the electromechanical device.

15. The method of claim 14, wherein the lattice support structure comprises a harness attachment feature configured to secure the electrical wiring harness to a vehicle panel.

16. The method of claim 15, wherein the lattice support structure further comprises a connector retention feature, wherein the connector retention feature is configured to retain a connector in a fixed connector position.

17. The method of claim 16, wherein the lattice support structure further comprises a manipulation feature configured to grasp and manipulate the electrical wiring harness assembly.

18. The method of claim 17, wherein the lattice support structure further comprises a wire retention feature configured to retain a jumper wire harness.

19. The method of claim 18, wherein the lattice support structure further comprises a wire protection feature configured to surround the electrical conductor.

* * * * *